US011831132B2

(12) United States Patent
Stier

(10) Patent No.: US 11,831,132 B2
(45) Date of Patent: Nov. 28, 2023

(54) COLOR-CODING SYSTEM FOR USE IN POWER DISTRIBUTION

(71) Applicant: GMS Distribution LLC, Fort Wayne, IN (US)

(72) Inventor: Gerrett M. Stier, Mukilteo, WA (US)

(73) Assignee: GMS Distribution LLC, Fort Wayne, IN (US)

( * ) Notice: Subject to any disclaimer, the term of this patent is extended or adjusted under 35 U.S.C. 154(b) by 422 days.

(21) Appl. No.: 17/186,084

(22) Filed: Feb. 26, 2021

(65) Prior Publication Data
US 2021/0273418 A1 Sep. 2, 2021

Related U.S. Application Data

(60) Provisional application No. 62/983,241, filed on Feb. 28, 2020.

(51) Int. Cl.
*H02B 1/52* (2006.01)
*H02B 1/20* (2006.01)
*H02J 13/00* (2006.01)
*H02H 7/22* (2006.01)

(52) U.S. Cl.
CPC ............ *H02B 1/20* (2013.01); *H02B 1/52* (2013.01); *H02H 7/22* (2013.01); *H02J 13/00002* (2020.01)

(58) Field of Classification Search
CPC ....... H02B 1/20; H02B 1/52; H02J 13/00002; H02H 7/22
See application file for complete search history.

(56) References Cited

U.S. PATENT DOCUMENTS

| 5,196,982 | A | 3/1993 | Landsbert et al. |
| 5,574,622 | A * | 11/1996 | Brown .................... F02B 63/04 |
| | | | 439/577 |
| 7,275,967 | B1 | 10/2007 | Olliff |
| 7,906,869 | B2 | 3/2011 | Lee et al. |
| 9,304,947 | B2 | 4/2016 | Naaman |
| 10,236,648 | B2 | 3/2019 | Irons et al. |
| 11,201,455 | B1 * | 12/2021 | Lee .......................... H02B 1/03 |
| 11,404,852 | B2 * | 8/2022 | French ................. H05K 7/1492 |
| 2015/0006128 | A1 | 1/2015 | Enenkel et al. |
| 2018/0041072 | A1 | 2/2018 | Clifton et al. |
| 2018/0373548 | A1 * | 12/2018 | Nassoura ............ G06F 9/44505 |
| 2022/0200250 | A1 * | 6/2022 | Brooks ................... H02B 1/04 |

FOREIGN PATENT DOCUMENTS

CA 2146511 A1 10/1996

* cited by examiner

*Primary Examiner* — Robert J Hoffberg
(74) *Attorney, Agent, or Firm* — Faegre Drinker Biddle & Reath LLP

(57) ABSTRACT

The present disclosure provides an identifier-coding system for use in disaster recovery. The system allows a user to track the use of different single-phase power circuits from a centrally located, three-phase generator to one or more remote worksites, including by visual identification of each downstream ground fault circuit interrupter (GFCI) outlet. The present system also provides tracking from a three-phase distribution panel to the remote power outlet modules to simplify fault correction if an overload or short circuit were to occur.

15 Claims, 7 Drawing Sheets

COLOR-CODING SYSTEM FOR USE IN POWER DISTRIBUTION

CROSS-REFERENCE TO RELATED APPLICATION

This application claims the benefit of U.S. Provisional Application Ser. No. 62/983,241, filed Feb. 28, 2020 and entitled COLOR-CODING SYSTEM FOR USE IN POWER DISTRIBUTION, the entire disclosure of which is hereby expressly incorporated herein by reference.

BACKGROUND

1. Technical Field

The present invention relates to a coding system for mobile electrical equipment and, more particularly, to a color-coded electrical distribution system to assist in distribution of generator-produced power to remote work areas, maximization of three-phase generator production, prevention of overloads, and simplification of balancing phase loads.

2. Background

Power outlet modules that hook up to generators are well-known in the industry. They are generally used in conjunction with high-capacity, three-phase generators to distribute power to various end points away from the generator. A central panel receives power from the generator and splits it up equally between the three "legs" or phases of the source power. A common use for such power outlet modules is in emergency response, e.g., after hurricanes. In such emergency response applications, a large, truck-based generator may be brought in and used to run fans, dehumidifiers, and tools for several houses or other structures within a certain perimeter around the truck. The power outlet module allows distribution of power from the generator to the various structures through a set of long extension cords.

For optimal performance, the amperage of each power leg should stay relatively balanced and below a threshold amperage, depending on the configuration of the generator. If the amperage exceeds the threshold for any one leg, or if the amperage among two or more legs becomes imbalanced, it can cause voltages to stray from their nominal working ranges and/or result in power outages or power surges. In turn, devices plugged into the generator can be damaged or fail to run properly. The generator may also be damaged if it is left to run inefficiently for long periods of time. Equipment and generators used in flood and other disaster recovery situations can be very expensive, and hard to replace on short notice.

What is needed is an improvement over the foregoing.

SUMMARY

The present disclosure provides an identifier-coding system for use in disaster recovery. The system allows a user to track the use of different single-phase power circuits from a centrally located, three-phase generator to one or more remote worksites, including by visual identification of each downstream ground fault circuit interrupter (GFCI) outlet. The present system also provides tracking from a three-phase distribution panel to the remote power outlet modules to simplify fault correction if an overload or short circuit were to occur.

One embodiment of the present disclosure is a power distribution system which includes a three-phase distribution panel including a first phasemeter having a first display indicative of a first phase current, the first phase meter having a first meter identifier, a second phase meter having a second display indicative of a second phase current, the second phase meter having a second meter identifier, the second meter identifier different from the first meter identifier, and a third phase meter having a third display indicative of a third phase current, the third phase meter having a third meter identifier, the third meter identifier different from the first and second meter identifiers; a first power outlet module including: a first electrical outlet connected to the first phase and having a first outlet identifier corresponding to the first meter identifier; and a second electrical outlet connected to the second phase and having a second outlet identifier corresponding to the second meter identifier; a second power outlet module including a third electrical outlet connected to the second phase and having the second outlet identifier; and a fourth electrical outlet connected to the third phase and having a third outlet identifier corresponding to the third meter identifier; and a third power outlet module including a fifth electrical outlet connected to the first phase and having the first outlet identifier; and a sixth electrical outlet connected to the third phase and having the third outlet identifier.

According to another embodiment of the present disclosure, the mobile power generation system could include a mobile power generator configured to generate three-phase power; a three-phase distribution panel connected to the three-phase power, the three-phase distribution panel including a first phasemeter having a first display indicative of a first phase current, the first phase meter having a first meter identifier, a second phase meter having a second display indicative of a second phase current, the second phase meter having a second meter identifier, the second meter identifier different from the first meter identifier, and a third phase meter having a third display indicative of a third phase current, the third phase meter having a third meter identifier, the third meter identifier different from the first and second meter identifiers; a first power outlet module including a first electrical outlet connected to the first phase and having a first outlet identifier corresponding to the first meter identifier; and a second electrical outlet connected to the second phase and having a second outlet identifier corresponding to the second meter identifier; a second power outlet module including a third electrical outlet connected to the second phase and having the second outlet identifier; and a fourth electrical outlet connected to the third phase and having a third outlet identifier corresponding to the third meter identifier; and a third power outlet module including a fifth electrical outlet connected to the first phase and having the first outlet identifier; a sixth electrical outlet connected to the third phase and having the third outlet identifier; and a plurality of electrical loads respectively connected to at least one of the first power outlet module, the second power outlet module and the third power outlet module.

The present disclosure also provides a method of distributing power from a power generator; the method includes providing multi-phase power from the power generator to a multi-phase distribution panel, the multi-phase distribution panel having a first phase meter having a first meter identifier and a second phase meter having a second meter identifier different from the first meter identifier; connecting a first power outlet to a first phase of the multi-phase distribution panel, the first power outlet having a first outlet identifier corresponding to the first meter identifier; connecting a second power outlet to a second phase of the multi-phase distribution panel, the second power outlet having a second outlet identifier corresponding to the second meter identifier; connecting a first electrical load to the first power outlet; connecting a second electrical load to the second power outlet; and assessing a balance between the first electrical load and the second electrical load by comparing a nominal readout from the first phase meter to a nominal readout from the second phase meter.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
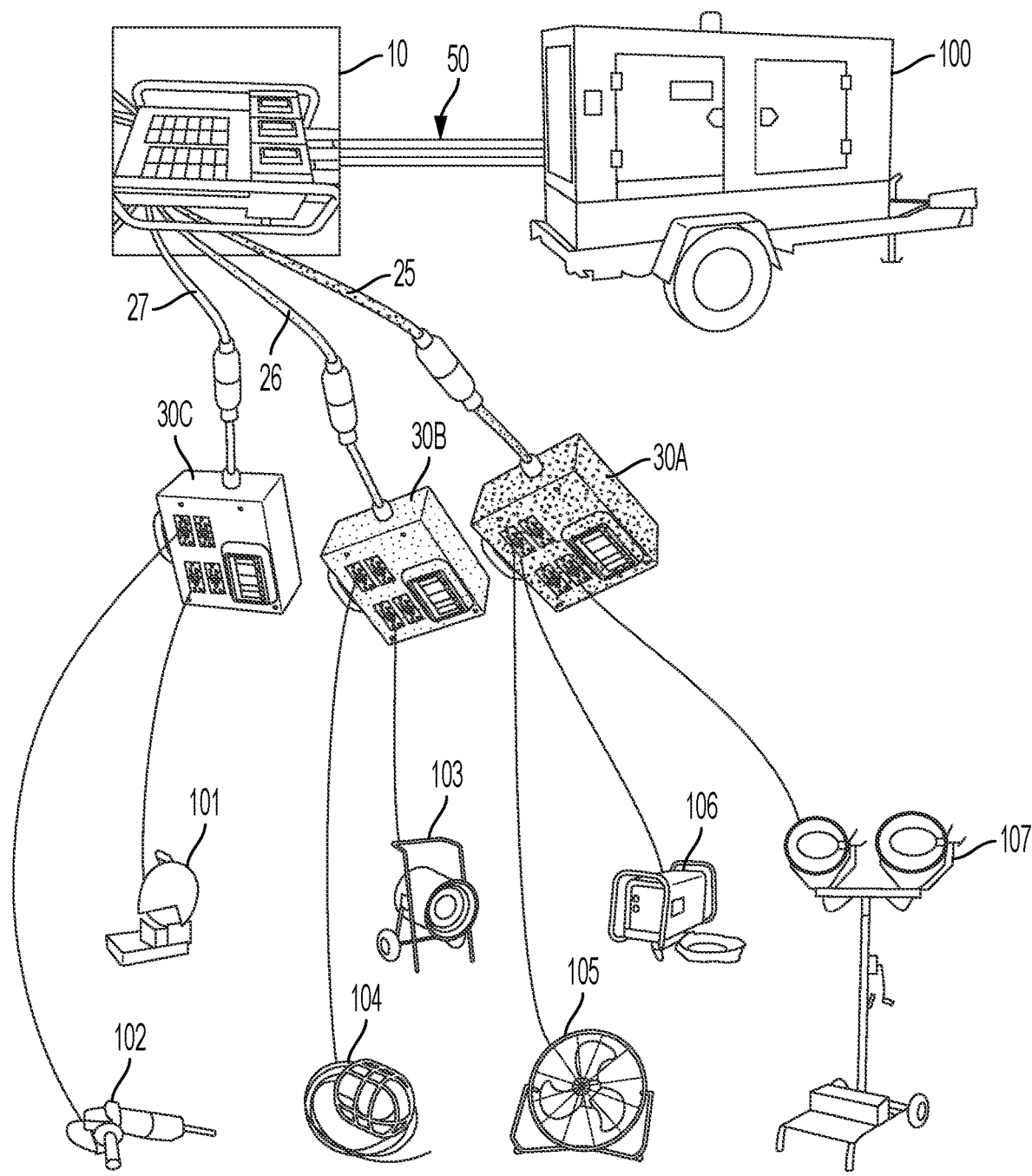
FIG. 1 is an in-use depiction of the color-coded power distribution system made in accordance with the present disclosure.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise form disclosed.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

With respect to the forgoing description, it is important to note that "identifier" can mean visual, tactile, auditory, or any other identifying means or method. Additionally, "identifier" for the purposes of the present invention could mean any combination of the previously mentioned identifying means or methods. In the case of a color-based identifying system, a single color, or a family of colors could be assigned to one group or phase of the present system as described in detail below. For example, a "family" of colors can include red, dark red, light red, maroon, pink, etc. Another "family" of colors might include blue, dark blue, light blue, sky blue, teal, etc. White, gray and black are also considered "colors" for purposes of the present disclosure. Although color is used as the exemplary identifier as shown in the figures and described in detail herein, it is appreciated that other identifiers may be used in accordance with the principles of the present disclosure. For example visual patterns or other visual identifiers may be used in lieu of color. Tactile identifiers, such as knurling, ridges or the like, may also be used as identifiers in lieu of color. Moreover, any identifier distinguishable by the user of the system may be used, or a combination of identifiers may be used, as required or desired for a particular application Now turning to FIG. 1, the system is shown configured for use during an emergency, or disaster recovery scenario. Generator 100 is shown as a large, mobile fuel-powered generator which produces a primary three-phase signal. In the illustrated embodiment, generator 100 has its own chassis and wheels such that it can be towed behind a truck or other vehicle, such as for delivery to a worksite. In some embodiments, generator 100 has a nameplate capacity of between 40 KW and 72 KW, such as 50 KW, 60 KW, and 70 KW. Optionally, the system may include a transformer for receiving the three-phase power and producing a transformed three-phase power signal which is received by the three-phase distribution panel 10 as the three-phase power. Such a transformer may be useful, for example, for stepping 480 VAC three-phase power to 208 VAC three-phase power prior to further distribution into 120 VAC single-phase signals by distribution panel 10, as described below.

Figure 4:
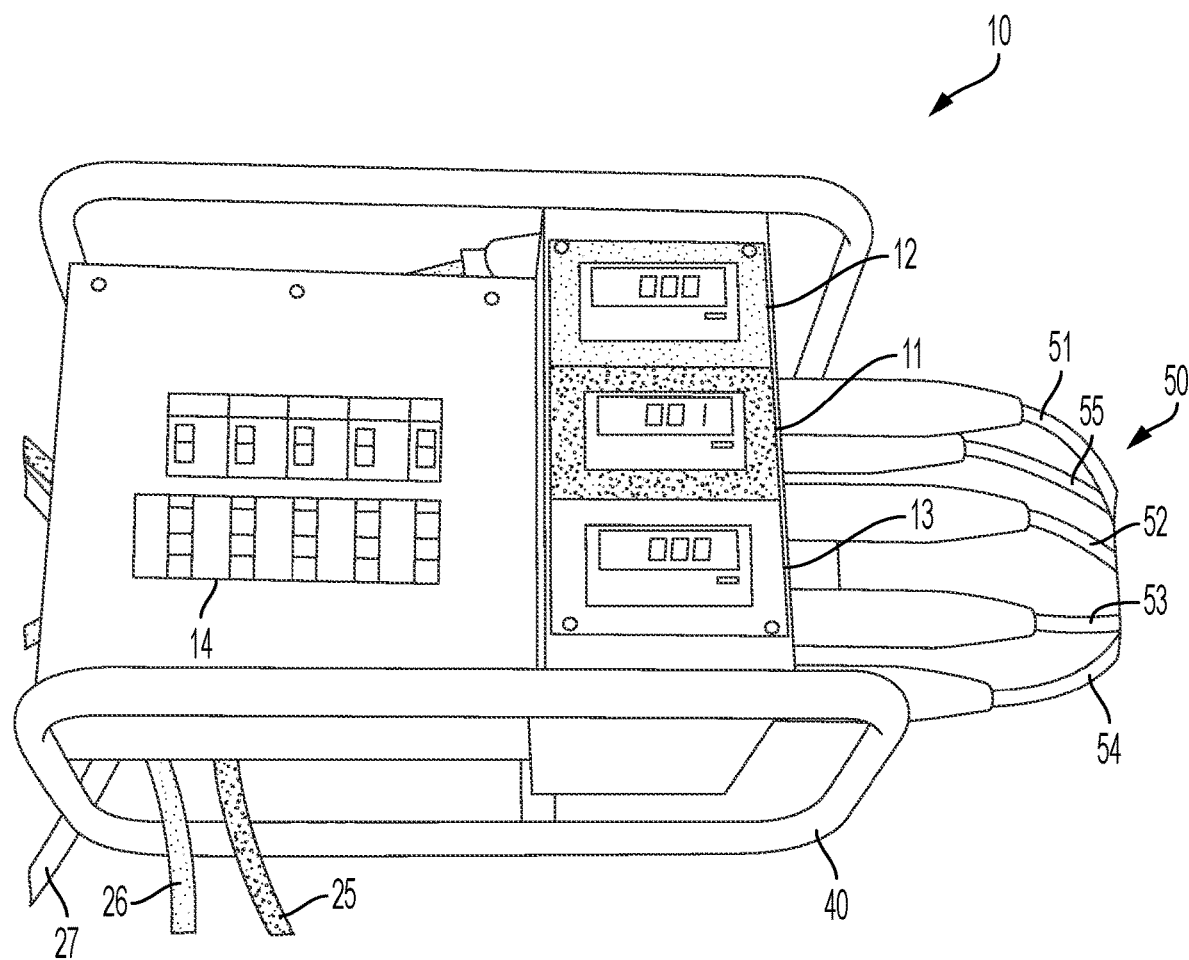
FIG. 4 is a perspective view of the distribution panel of the distribution system of FIG. 1.
Figure 5:
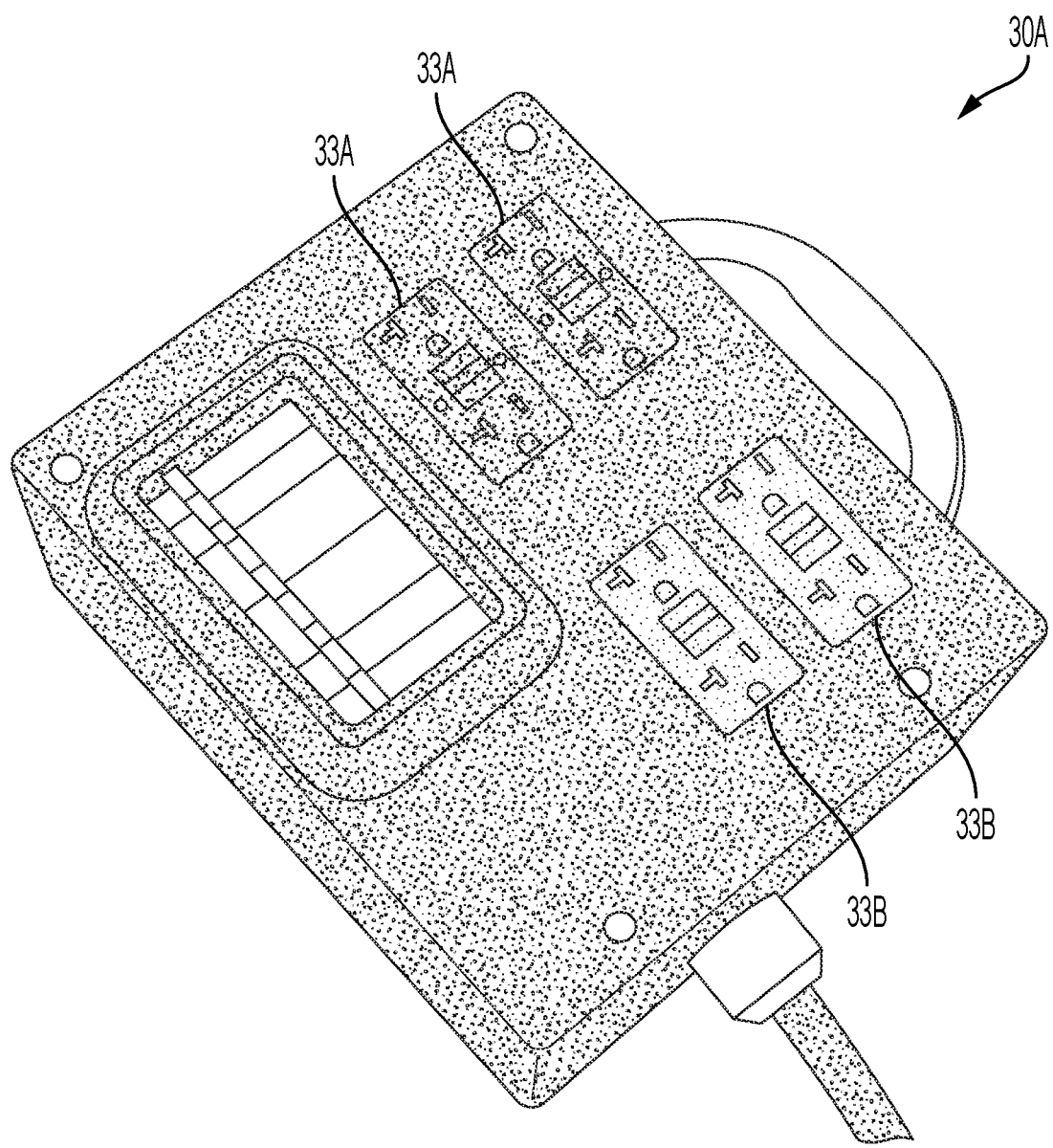
FIG. 5 is a perspective view of one type of power outlet module of the distribution system of FIG. 1.

As best shown in FIG. 4, three-phase distribution panel 10 receives the three-phase power from generator 100 via cable assembly 50 which includes a first power leg 51 corresponding to the first phase, a second power leg 52 corresponding to the second phase, a third power leg 53 corresponding to the third phase, a ground wire 54, and a neutral wire 55. Three-phase distribution panel 10 also includes a first phase meter 11 that displays a power throughput of the first power leg, a second phase meter 12 displaying a power throughput of the second leg, and a third phase meter 13 displaying a power throughput of the third leg. Each phase meter 11, 12, and 13 has a distinct identifier which identifies the particular phase corresponding to the meter, e.g., by color (red, black, grey) as shown. Three-phase distribution panel 10 also includes a breaker assembly 14. Breaker assembly 14 includes a series of breakers respectively disposed between one of phase meters 11, 12, and 13 and their corresponding cables 25, 26 and 27. Each breaker in breaker assembly 14 limits the current passing through each individual phase by interrupting the current flow if it exceeds a predetermined threshold. Each breaker in the breaker assembly 14 has a separate and distinct identifier, or identifier combination. Three-phase distribution panel 10 also optionally includes a surge protector. The entire system of the present power distribution system can operate with a single surge protector connected to the three-phase distribution panel 10 because all power goes through three-phase distribution panel 10 before it is fed to any equipment.

Figure 2:
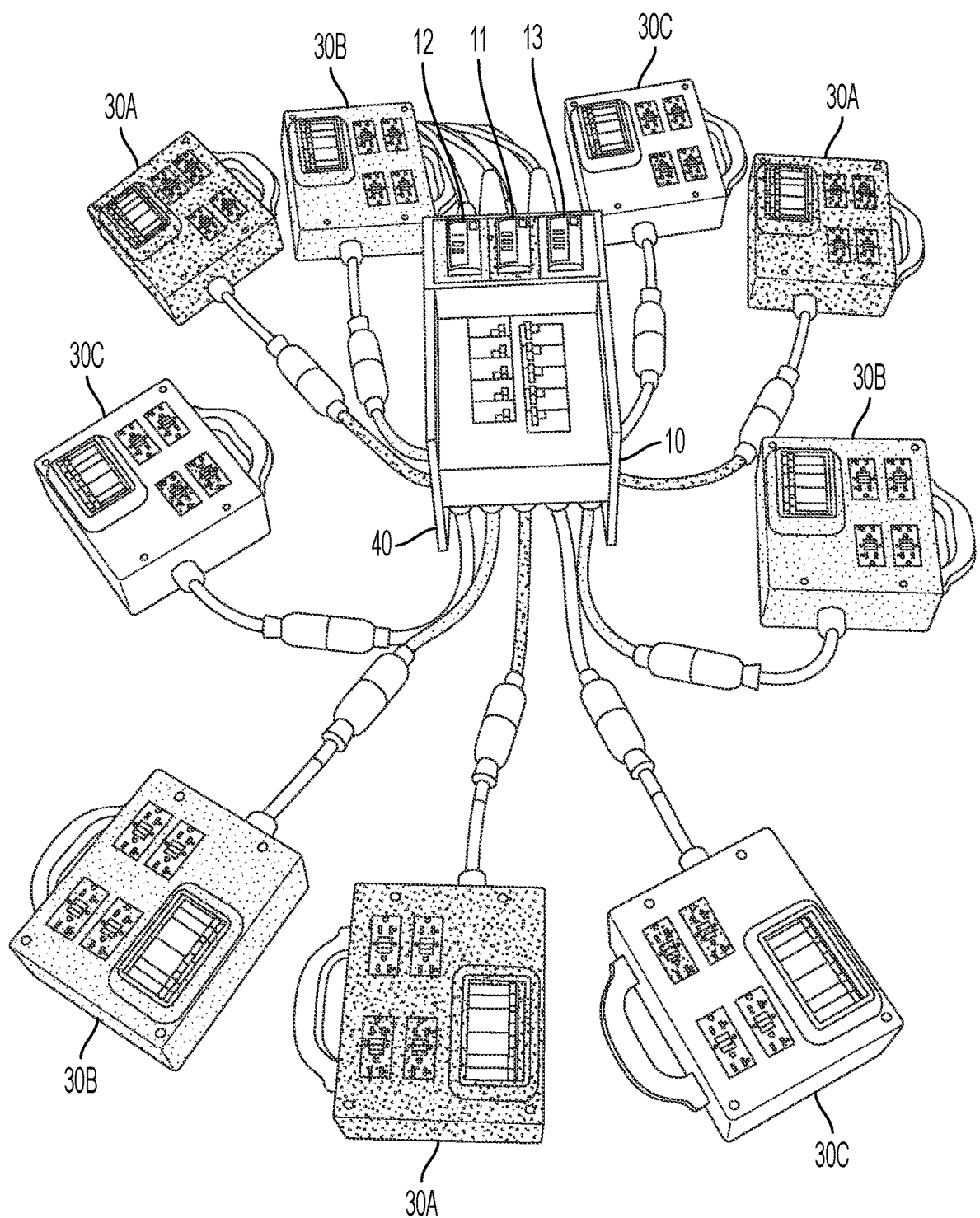
FIG. 2 is a perspective view of various color-coded components of the power distribution system of FIG. 1.

Extending from three-phase distribution panel 10 are outlet cables 25, 26, and 27. As shown in FIG. 2, there can be multiples of each of outlet cables 25, 26, and 27 extending from distribution panel 10, such as two of each cable 25, 26 and 27. Outlet cables can have any type of identifier mentioned above including color (black, red, yellow) as shown. Outlet cables 25 have an identifier distinct from outlet cables 26 and outlet cables 27 and corresponding to the identifier from its corresponding breaker in breaker assembly 14. Outlet cables 26 have an identifier distinct from outlet cables 25 and outlet cables 27 and corresponding to the identifier from its corresponding breaker in breaker assembly 14. Outlet cables 27 have an identifier distinct from outlet cables 25 and outlet cables 26 and corresponding to the identifier from its corresponding breaker in breaker assembly 14. Outlet cables 25, 26, and 27 extend from distribution panel 10 and provide an inlet which can couple to a power outlet module directly or via an extension cord of any desired length for routing power to a distant load, as further described herein.

As shown in FIG. 2, attached to outlet cable 25 is a power outlet module 30A. Power outlet module 30A includes an identifier that identical or is of the same family of identifiers as outlet cable 25 and its corresponding breaker. Power outlet module 30A includes at least one electrical outlet, such as two pairs of outlets 33A and 33B as illustrated. Each electrical outlet 33A has the same or similar identifier as phase meter 11. The nominal amperage passing through electrical outlets 33A is displayed by phase meter 11. Each electrical outlet 33B has the same or similar identifier as phase meter 12, and the nominal amperage passing through electrical outlets 33B is displayed by the reading of phase meter 12.

Figure 6:
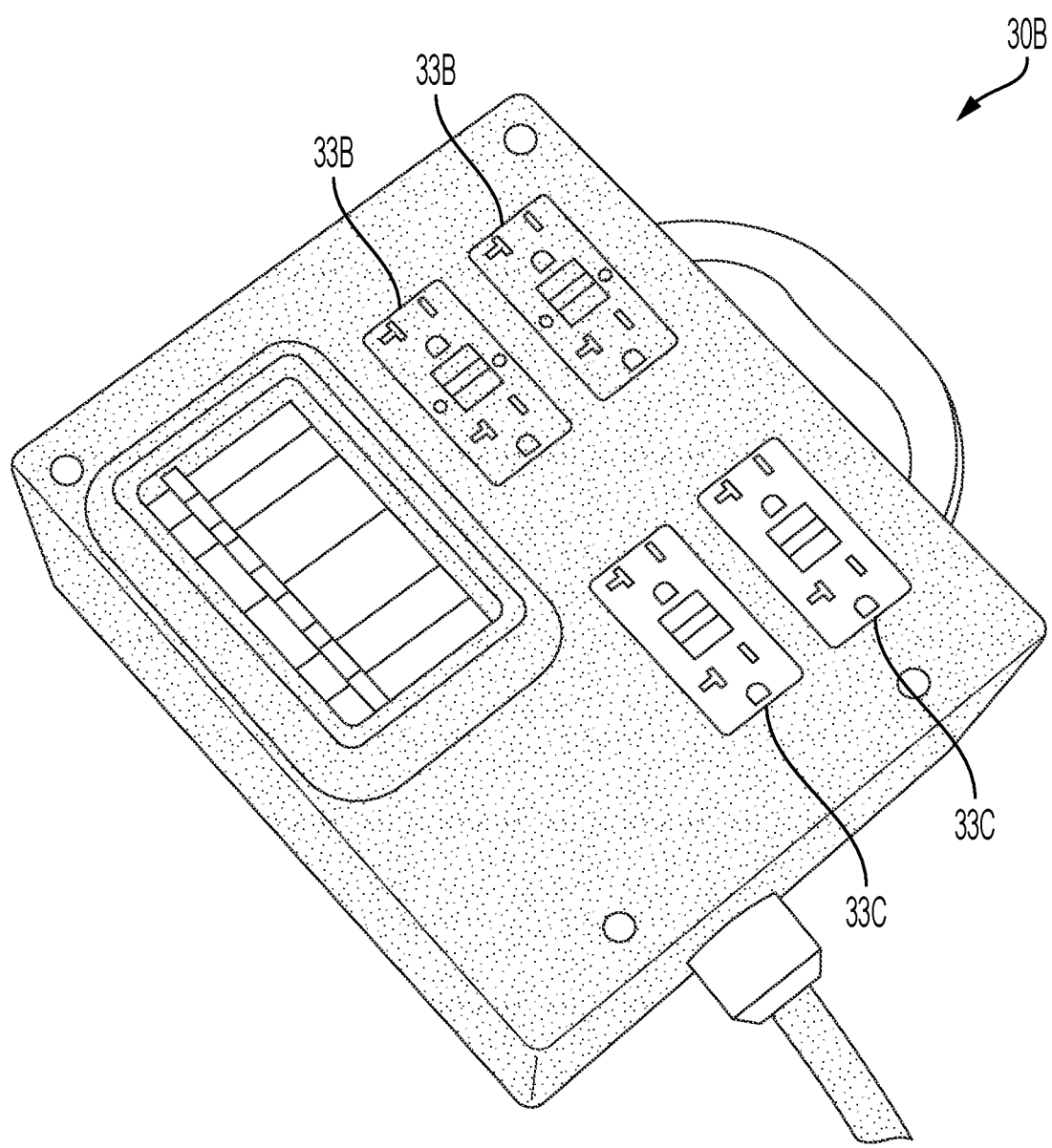
FIG. 6 is a perspective view of another type of power outlet module of the distribution system of FIG. 1.

Similarly, as shown in FIGS. 2 and 6, attached to each outlet cable 26 is a power outlet module 30B. Power outlet module 30B includes an identifier that is identical or is of the same family of identifiers as outlet cable 26 and its corresponding breaker. Power outlet module 30B includes at least one electrical outlet, such as two pairs of outlets 33B and 33C as illustrated. Each electrical outlet 33C has the same or similar identifier as phase meter 13, and the nominal amperage passing through electrical outlets 33C is displayed by the reading of phase meter 13.

Figure 7:
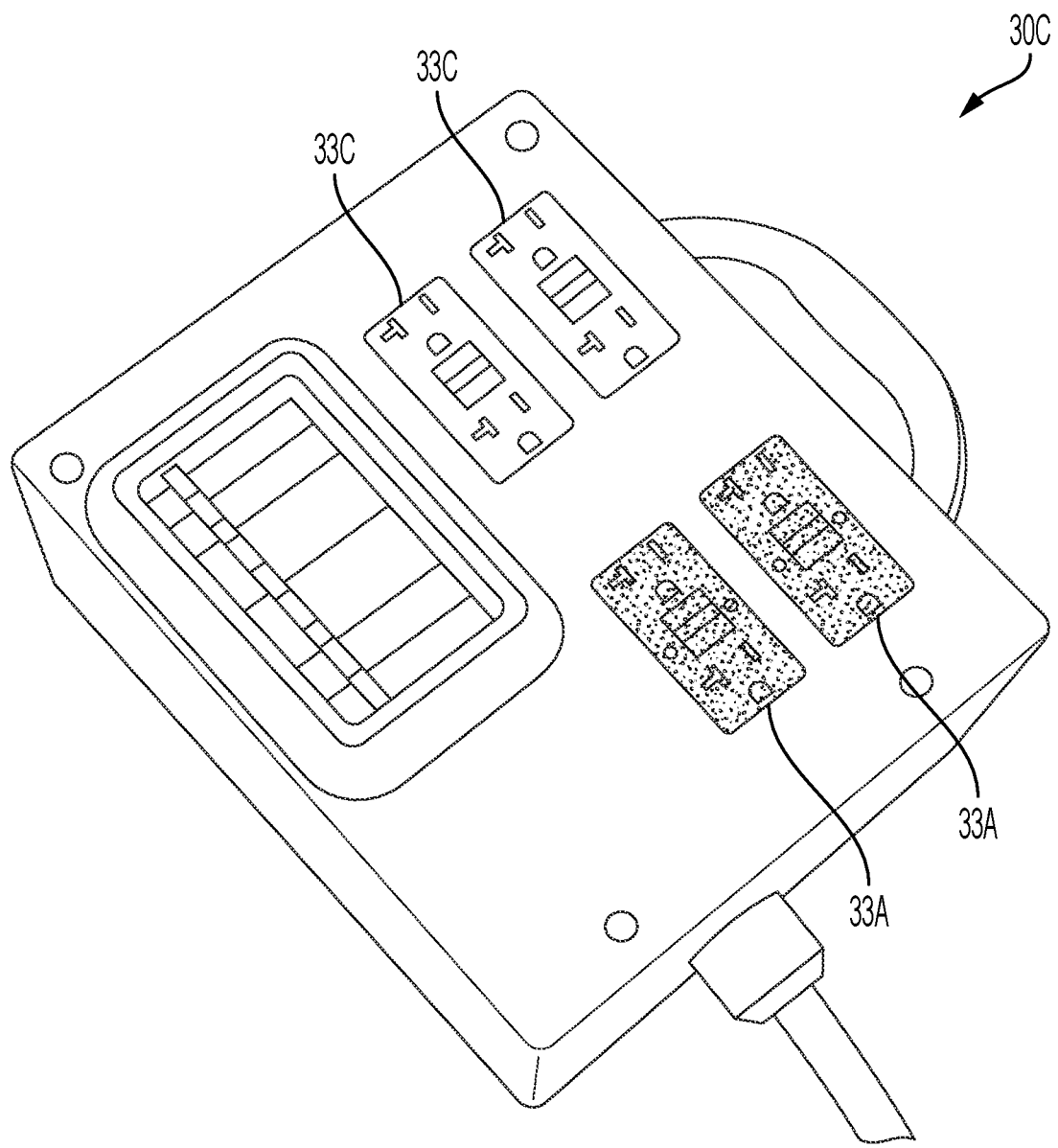
FIG. 7 is a perspective view of yet another type of power outlet module of the distribution system of FIG. 1.

As shown in FIGS. 2 and 7, attached to each outlet cable 27 is a power outlet module 30C. Power outlet module 30C includes an identifier that is identical or is of the same family of identifiers as outlet cable 27 and its corresponding breaker. Power outlet module 30C includes at least one electrical outlet, such as two pairs of outlets 33A and 33C as illustrated. Electrical outlets 33A, 33B, and 33C can be any type of electrical outlet, including for example ground fault circuit interrupter (GFCI) outlets.

Each power outlet module 30A, 30B, and 30C includes at least one breaker 36. The number of breakers 36 included on power outlet modules 30A, 30B, and 30C, depends on the number of outlets 33A, 33B, and 33C. Each breaker 36 corresponds to a specific outlet 33A, 33B, or 33C. Breakers 36 prevent current overloads to the individual outlets 33A, 33B, 33C. Additionally, each breaker 36 can include an identifier corresponding to the color and/or location of the outlet 33A, 33B, or 33C it is connected to.

In use, the present system may be used in situations where power generated by a three-phase generator (e.g., generator 100) is needed to be distributed to various distant loads. Exemplary such situation include disaster relief and emergency restorations. For example, a recovery and/or restoration worker or team may travel to a place where a flood, hurricane, or other natural disaster has occurred. Referring to FIG. 1, such a team may bring or rent various electrical equipment, including generator 100, and equipment to be powered by generator 100 such as saws 101, power tools 102, dehumidifiers 103, lights 104, portable power units 106, fans 105, heat lamps 107, etc. (collectively, the "loads"). The loads may be distributed amongst the damaged area, which could span a single home or an entire town or city. A single generator 100 may power such loads spread out over multiple areas of a house, multiple rooms, multiple floors, or even multiple buildings.

The system described herein may be used in such a situation to optimize the power produced by three-phase generators 100, thereby avoiding system failure and promoting the most efficient use of available electrical power. For example, the present system can be used to balance the usage of the three phases of energy from generator 100. Different types of generators are optimized differently, for example, a 72 KW generator may be optimized by pulling up to about 160 amps at 120 VAC from each of the three phases of power generated; a 70 KW generator may be optimized by pulling up to about 155 amps per phase; a 60 KW generator may be optimized by pulling up to about 133 amps per phase; a 50 KW generator may be optimized by pulling up to about 111 amps per phase; and a 40 KW generator may be optimized by pulling up to about 88 amps per phase. The amperage of each phase can be tracked and equalized via the phase meters 11, 12, and 13 of three-phase distribution panel 10.

To further illustrate the present invention, examples of in-use scenarios and assembly steps are discussed in detail below. Note however, that while the examples are intended to describe the present invention and its impact on disaster recovery situations, it is not intended to limit the disclosure to only the examples set forth.

One exemplary use of the present system is water-damage remediation, such as may be needed after a flood or a hurricane in a populated area. A disaster recovery team or company would arrive and try to mitigate damage to homes and property by removing accumulated water with electrical pumps and drying moisture from buildings with fans, dehumidifiers, heaters and the like. A team such as this may use generator 100 in the event that grid-based electrical service is unavailable. Generator 100 for use in emergencies and disaster sites are usually mobile, e.g., by being mounted to a trailer as shown in FIG. 1. The team would connect generator 100 to three-phase distribution panel 10 via cable assembly 50, including first power leg 51, second power leg 52, third power leg 53, ground 54 and neutral 55, as described above.

Figure 3:
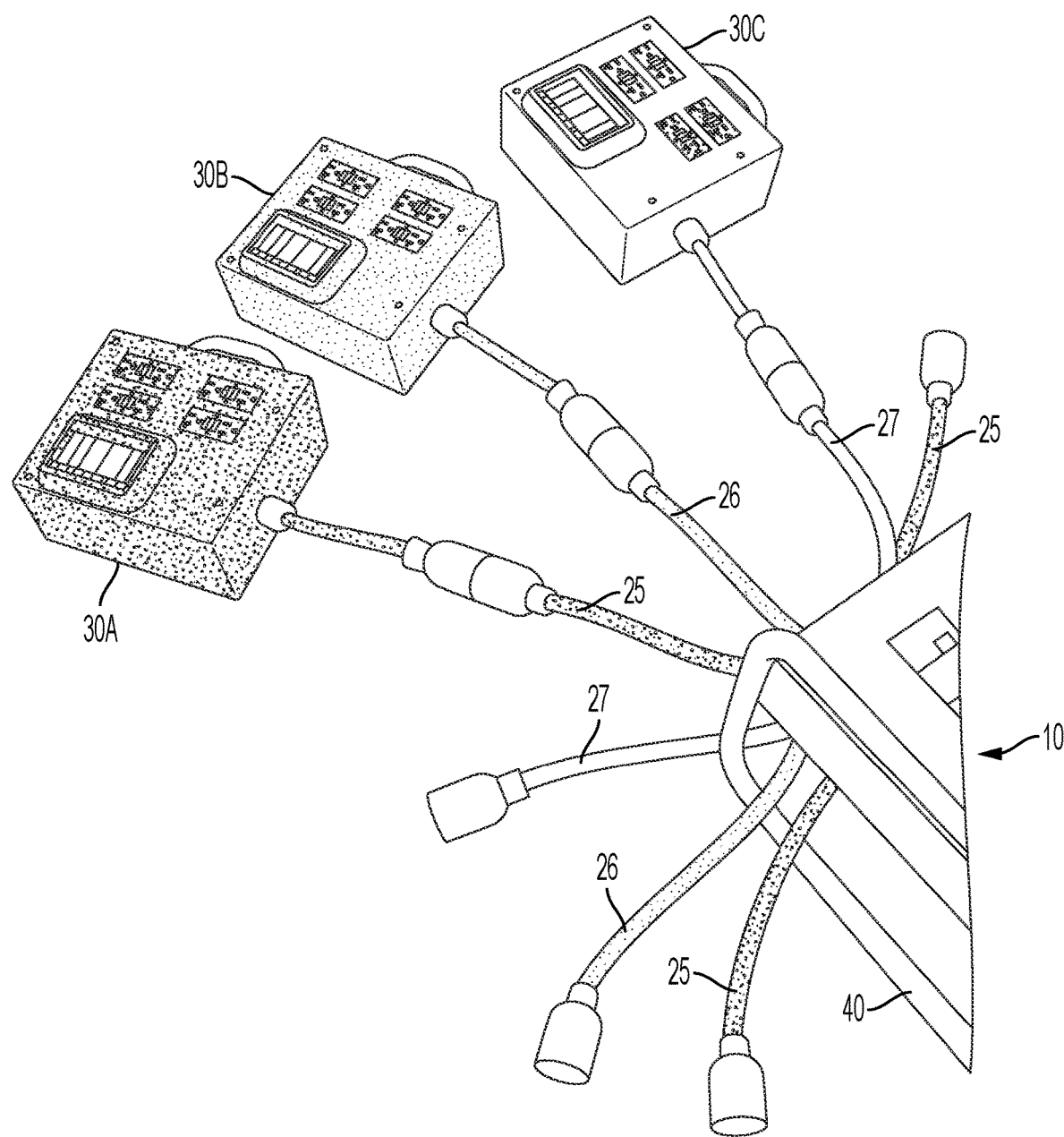
FIG. 3 is a perspective view of the color-coded coupling system between power outlet modules and the distribution panel of the distribution system of FIG. 1.

Outlet cables 25, 26, and 27 are shown pre-attached to three-phase distribution panel 10 (FIGS. 2 and 3), but may be attached to three-phase distribution panel 10 as part of the set-up procedure before or after three-phase distribution panel 10 is connected to generator 100 (provided electrical current is not yet flowing from generator 100 through panel 10). In the illustrated embodiment, outlet cables 25, 26, and 27 are relatively short, such as between 1-4 feet, which allows cables 25, 26, and 27 to be stowed easily for transport (e.g., by tucking the cables into the spatial envelope defined by frame 40 of distribution panel 10). Extension cords can then be attached at one end to outlet cables 25, 26, and 27, and to the other end to power outlet modules 30A, 30B, and 30C. Power outlet modules 30A would be attached to outlet cables 25 via extension cords; power outlet modules 30B would be attached to outlet cables 26 via extension cords; and power outlet modules 30C would be attached to outlet cables 27 via extension cords. Of course, power outlet modules 30A, 30B, and/or 30C can also be attached directly to their respective cables 25, 26 and 27 without the use of extension cords, if desired.

As mentioned above, outlet cables 25 are connected to breakers of breaker assembly 14 of three-phase distribution panel 10. In one exemplary embodiment, each specific outlet cable 25 has an identifier that matches an identifier of its individual breaker. Additionally, the power outlet module 30A has the same identifier (or an identifier from a common family) that matches both the outlet cable 25 its breaker. Also, power outlet module 30A includes at least one first electrical outlet 33A which has an identifier that matches the identifier associated with first phase meter 11, and at least one second electrical outlet 33B which has an identifier that matches the identifier associated with second phase meter 12. Each of these identifiers are different from one another (e.g., each has a different color) such that the cable/outlet module relationship is readily identifiable among the various possibilities, and is distinct from the outlet/phase meter relationship.

Once power outlet module 30A is connected to the correct outlet cable 25, when the recovery team plugs equipment into a first electrical outlet 33A, the amperage that is being pulled from the first power leg 51 will be displayed on first phase meter 11. Likewise, when the recovery team plugs equipment into a second electrical outlet 33B, the amperage that is being pulled from the second power leg 52 will be displayed on second phase meter 12.

Similarly, outlet cables 26 are connected to breakers of breaker assembly 14 of three-phase distribution panel 10. In one exemplary embodiment, each specific outlet cable 26 has an identifier that matches an identifier of its individual breaker. Additionally, the power outlet module 30B has the same identifier (or an identifier from a common family) that matches both the outlet cable 26 its breaker. Also, power outlet module 30B includes at least one second electrical outlet 33B which has an identifier that matches the identifier associated with second phase meter 12, and at least one third electrical outlet 33C which has an identifier that matches the identifier associated with third phase meter 13. Each of these identifiers are different from one another (e.g., each has a different color) such that the cable/outlet module relationship is readily identifiable among the various possibilities, and is distinct from the outlet/phase meter relationship.

Once power outlet module 30B is connected to the correct outlet cable 26, when the recovery team plugs equipment into a second electrical outlet 33B, the amperage that is being pulled from the second power leg 52, will be displayed on second phase meter 12. Likewise, then the recovery team plugs equipment into a third electrical outlet 33C, the amperage that is being pulled from the third power leg 53, will be displayed on third phase meter 13.

Also mentioned above, outlet cables 27 are connected to breakers of breaker assembly 14 of three-phase distribution panel 10. In one exemplary embodiment, each specific outlet cable 27 has an identifier that matches an identifier of its individual breaker. Additionally, the power outlet module 30C has the same identifier (or an identifier from a common family) that matches both the outlet cable 27 its breaker. Also, power outlet module 30C includes at least one first electrical outlet 33A which has an identifier that matches the identifier associated with first phase meter 11, and at least one third electrical outlet 33C which has an identifier that matches the identifier associated with third phase meter 13. Each of these identifiers are different from one another (e.g., each has a different color) such that the cable/outlet module relationship is readily identifiable among the various possibilities, and is distinct from the outlet/phase meter relationship.

Once power outlet module 30C is connected to the correct outlet cable 27, when the recovery team plugs equipment into a first electrical outlet 33A, the amperage that is being pulled from the first power leg 51, will be displayed on first phase meter 11. Likewise, when the recovery team plugs equipment into a third electrical outlet 33C, the amperage that is being pulled from the third power leg 53, will be displayed on third phase meter 13.

As mentioned above, based on the type of generator 100 the recovery team is working with (how many kilowatts it produces), the team knows exactly how much amperage can be pulled from each leg/phase. In an exemplary embodiment, this information may be printed on an external surface of distribution panel 10 for easy reference by the operator. Additionally, because the electrical outlets 33A, 33B, and 33C are identified to match the leg they pull power from, if one leg is pulling too much power, as readily identified by a comparison of the nominal current displayed by the respective phase meters 11, 12, and 13, or if one leg is pulling substantially more or less than the other two legs, the team can quickly ascertain exactly how to resolve the issue by moving a piece or multiple pieces of equipment (FIG. 1, 101, 102, 103, 104, 105, 106, 107) from one group of electrical outlets (electrical outlets 33A for example) to another (in the example, electrical outlets 33B and/or 33C), thus lowering an overloaded leg, or simply balancing the amperage of each leg to maximize the efficiency of generator 100.

Similarly, if a piece of equipment, or a group of equipment (FIG. 1, 101, 102, 103, 104, 105, 106, 107) that is plugged into the system faults and stops working, the color-coding system helps identify where the problem is by providing a readily observable visual indicator of the circuit connected to the faulty equipment. For example, the breakers on the power outlet modules 30A, 30B, and 30C have identifiers matching the electrical outlets 33A, 33B, or 33C that they control. So, if a piece of equipment that is plugged into one of the electrical outlets 33A, 33B, or 33C on power outlet module 30A, 30B, or 30C faults, finding the correct breaker to flip is as simple as looking for the breaker with the same identifier as the failing outlet 33A, 33B, or 33C. Similarly, if multiple pieces of equipment that were all plugged into the same power outlet module 30A, 30B, or 30C stops working, or if in the example above, the single piece of equipment still did not work after flipping the breaker on the power outlet module 30A, 30B, or 30C, an operator can go to distribution panel 10 and flip the breaker on breaker assembly 14 that corresponds to the specific power outlet module 30A, 30B, or 30C that faulted. The correct breaker would be readily identifiable because the breakers have identifiers that match the specific power outlet module 30A, 30B, and 30C, with the respectively connected outlet cable 25, 26, and 27. Once the electrical connection is re-established, the operator can observe the corresponding meter 11, 12 or 13 to determine whether the nominal amperage is too high, or too far out of balance with the other amperages.

As discussed above, during assembly, the present system facilitates connection of the power outlet modules 30A, 30B and 30C to the correct phase meter by providing a visual (or other) identifier to ensure that each module 30A, 30B, 30C is plugged into an outlet cable 25, 26 or 27 with a matching identifier. If a power outlet module 30A, 30B, or 30C is plugged into an incorrect outlet cable, the colors (or other identifiers) will not match, providing a readily observable indication which prevents the electrical outlets 33A, 33B or 33C on the power outlet module 30A, 30B, or 30C from pulling power from an incorrectly identified power phase and preventing false readings. This identification system ensures that the power outlet modules 30A, 30B, and 30C are plugged into outlet cables 25, 26, and 27 respectively. Therefore, equipment may be plugged in to any power outlet module 30A, 30B, or 30C, at any distance away from the three-phase distribution panel 10, and the operator remains able to readily determine from the three-phase distribution panel 10 the balance of loads carried by the respective phase meters 11, 12, and 13. Where the balance is less even than desired or optimal, the operator can then instruct others to move equipment around to balance or lower the amperage of the phases, or flip the correct breaker to resolve a fault, without disrupting the working equipment, or traveling back and forth to equipment in different locations to located a correct breaker.

Working Example

The present system allows an operator to read the phase meters 11, 12 and 13 and determine whether and to what extent an imbalance exists among the power legs, and how much amperage capacity remains for any given leg. In use, this allows the user to efficiently balance amperage at each leg and keep amperages of each leg below a predetermined or otherwise specified limit.

In the present example, a generator 100 has a nameplate capacity of 72 kW and is operating with various equipment loads connected. Power coming from generator 100 to distribution panel 10 as 208 VAC three-phase power, which is then split into three phases each having a voltage of 120 VAC. While working with three-phase power from a 72 kW generator 100, each phase can distribute a maximum of 160 amps. To optimize and prevent failure of generator 100, the operator desired to balance the loads on each phase to the extent practical and possible.

In the present example, meters 11 (red), 12 (black), and 13 (yellow) display loads connected of 150 amps, 110 amps, and 135 amps respectively. The operator desired to connect two additional pieces of equipment that will pull 20 amps and 30 amps respectively. In order to optimize the generator power, while preventing any overload at any of the meters 11, 12 or 13, the operator determines that fifteen amps of existing demand can be transferred from a yellow outlet to a black outlet. Then, the new 20-amp load can be connected to a black outlet, such that the second (black) phase carries a total load of 145 amps. The new 30-amp load can then be plugged into a yellow outlet, such that the third (yellow) phase carries a total load of 150 amps. Phase meters 11, 12, and 13 now read 150, 145, and 150 amps respectively. These loads are as balanced as they can be, given the equipment needed, and none of the meters is at risk of overload.

Moreover, the operator has the ability to transfer specific loads to specific phases of power, and monitor loads and balances in real time and without manually measuring loads or performing time-consuming trial-and-error to determine which circuits should receive the new loads, and which outlets correspond to the desired circuits. This efficiency is the result of the identifier-coding system described in the present disclosure.

As noted above, this invention is specifically helpful for water restoration companies and first responders to natural disasters. The present color-coding system makes it easier, and more efficient to distribute power up to distances only limited by current extension cords on the market today, from a central generator, and to use that central location to monitor the legs, move electronics around, keep amperages balanced, and avoid any overloads or circuit faults.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power distribution system comprising:
a three-phase distribution panel including:
a first phase meter having a first display indicative of a first phase current of a first phase, the first phase meter having a first meter identifier,
a second phase meter having a second display indicative of a second phase current of a second phase, the second phase meter having a second meter identifier, the second meter identifier different from the first meter identifier, and
a third phase meter having a third display indicative of a third phase current of a third phase, the third phase meter having a third meter identifier, the third meter identifier different from the first and second meter identifiers;
a first power outlet module including:
a first electrical outlet connected to the first phase and having a first outlet identifier corresponding to the first meter identifier; and
a second electrical outlet connected to the second phase and having a second outlet identifier corresponding to the second meter identifier;
a second power outlet module including:
a third electrical outlet connected to the second phase and having the second outlet identifier; and
a fourth electrical outlet connected to the third phase and having a third outlet identifier corresponding to the third meter identifier; and
a third power outlet module including:
a fifth electrical outlet connected to the first phase and having the first outlet identifier; and
a sixth electrical outlet connected to the third phase and having the third outlet identifier.

2. The power distribution system of claim 1, wherein:
the first meter identifier is a first color and the first outlet identifier is an identical color or a color from the same family of colors as the first color;
the second meter identifier is a second color different from the first color, and the second outlet identifier is an identical color or a color from the same family of colors as the second color; and the third meter identifier is a third color different from the first color and the second color, and the third outlet identifier is an identical color or a color from the same family of colors as the third color.

3. The power distribution system of claim 1, wherein the three-phase distribution panel receives three-phase power having a first power leg corresponding to the first phase, a second power leg corresponding to the second phase, and a third power leg corresponding to the third phase.

4. The power distribution system of claim 3, further comprising:
a generator producing a primary three-phase power signal; and
a transformer receiving the primary three-phase power signal, the transformer producing a transformed three-phase power signal which is received by the three-phase distribution panel as the three-phase power.

5. The power distribution system of claim 4, wherein:
the primary three-phase power signal has a nominal voltage of 480 VAC, the transformed three-phase power signal has a nominal voltage of 208 VAC, and
each of the first, second and third phases of the three-phase power have nominal voltages of 120 VAC.

6. The power distribution system of claim 1, wherein:
the three-phase distribution panel includes:
a first plurality of outlet cables each connected to the first phase current and each having a first cable identifier;
a second plurality of outlet cables each connected to the second phase current and each having a second cable identifier different from the first cable identifier; and
a third plurality of outlet cables each connected to the third phase current and each having a third cable identifier different from the first cable identifier and the second cable identifier;
the first power outlet module is removably attachable to any of the first plurality of outlet cables, the first power outlet module having a first module identifier corresponding to the first cable identifier;
the second power outlet module is removably attachable to any of the second plurality of outlet cables, the second power outlet module having a second module identifier corresponding to the second cable identifier; and
the third power outlet module is removably attachable to any of the third plurality of outlet cables, the third power outlet module having a third module identifier corresponding to the third cable identifier.

7. The power distribution system of claim 1, wherein the first electrical outlets, second electrical outlets, and third electrical outlets are ground fault circuit interrupt (GFCI) outlets.

8. The power distribution system of claim 1, wherein the three-phase distribution panel further includes a surge protector.

9. The power distribution system of claim 1, wherein the three-phase distribution panel configured to receive 200 amps of electrical current at 208 VAC.

10. A mobile power generation system including:
a mobile power generator configured to generate three-phase power;
a three-phase distribution panel connected to the three-phase power, the three-phase distribution panel including:
a first phase meter having a first display indicative of a first phase current of a first phase, the first phase meter having a first meter identifier,
a second phase meter having a second display indicative of a second phase current of a second phase, the second phase meter having a second meter identifier, the second meter identifier different from the first meter identifier, and
a third phase meter having a third display indicative of a third phase current of a third phase, the third phase meter having a third meter identifier, the third meter identifier different from the first and second meter identifiers;
a first power outlet module including:
a first electrical outlet connected to the first phase and having a first outlet identifier corresponding to the first meter identifier; and
a second electrical outlet connected to the second phase and having a second outlet identifier corresponding to the second meter identifier;
a second power outlet module including:
a third electrical outlet connected to the second phase and having the second outlet identifier; and
a fourth electrical outlet connected to the third phase and having a third outlet identifier corresponding to the third meter identifier; and
a third power outlet module including:
a fifth electrical outlet connected to the first phase and having the first outlet identifier;
a sixth electrical outlet connected to the third phase and having the third outlet identifier; and
a plurality of electrical loads respectively connected to at least one of the first power outlet module, the second power outlet module and the third power outlet module.

11. The mobile power generation system of claim 10, wherein the plurality of electrical loads comprises at least one of:
air movers;
dehumidifiers;
lights; and
power tools,
whereby the mobile power generation system may be used for disaster recovery operations.

12. The mobile power generation system of claim 10, wherein:
the first meter identifier is a first color and the first outlet identifier is an identical color or a color from the same family of colors as the first color;
the second meter identifier is a second color different from the first color, and the second outlet identifier is an identical color or a color from the same family of colors as the second color; and
the third meter identifier is a third color different from the first color and the second color, and the third outlet identifier is an identical color or a color from the same family of colors as the third color.

13. The mobile power generation system of claim 10, wherein the three-phase power has a nominal voltage of 208 VAC.

14. The mobile power generation system of claim 13, further comprising:
a transformer receiving a primary three-phase power signal, the transformer producing a transformed three-phase power signal which is received by the three-phase distribution panel as the three-phase power.

15. The mobile power generation system of claim 14, wherein:
the primary three-phase power signal has a nominal voltage of 480 VAC,
the transformed three-phase power signal has the nominal voltage of 208 VAC, and
each of the first, second and third phases of the three-phase power have nominal voltages of 120 VAC.

* * * * *